Sept. 3, 1974             E. SCHMIDT            3,833,740
ONE-PORTION PACK FOR THE PREPARATION OF GROUND
ROASTED COFFEE READY FOR DRINKING
Filed June 17, 1971                                2 Sheets-Sheet 1
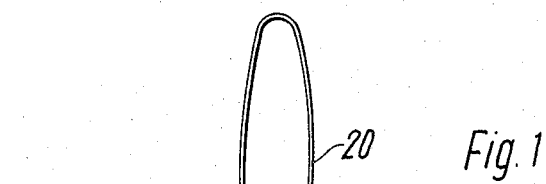
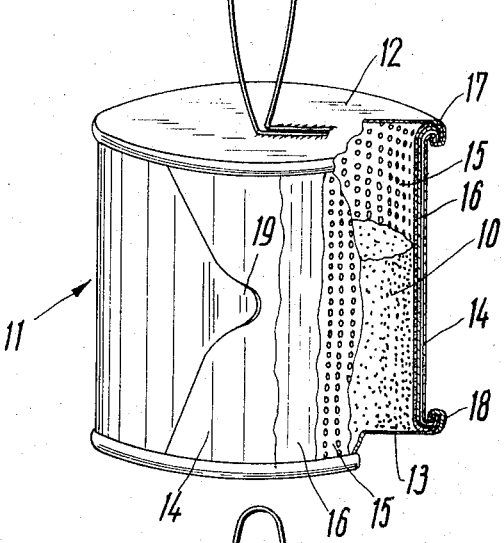

United States Patent Office 3,833,740
Patented Sept. 3, 1974

3,833,740
ONE-PORTION PACK FOR THE PREPARATION OF GROUND ROASTED COFFEE READY FOR DRINKING
Ernst Schmidt, Bremen, Germany, assignor to Joh. Jacobs & Co., Bremen, Germany
Filed June 17, 1971, Ser. No. 154,106
Int. Cl. A23f 1/00; B65b 29/02
U.S. Cl. 426—80                                    3 Claims

ABSTRACT OF THE DISCLOSURE

A pack, particularly in the form of a container for ground roasted coffee, provided with filter paper for the preparation of a filtered coffee for drinking, wherein said roasted coffee in said container is separated from said filter paper by a water-permeable parting layer through which said ground roasted coffee cannot pass.

BACKGROUND OF THE INVENTION

This invention relates to a pack, particularly in the form of a container for ground roasted coffee, provided with a filter for the preparation of a filtered coffee beverage from the ground coffee contained in the pack.

The invention more specifically concerns a prefabricated one-portion pack for the preparation of ground roasted coffee ready for drinking and containing a predetermined quantity of ground roasted coffee to satisfy a given requirement.

SUMMARY OF THE INVENTION

The object of the invention is to provide a one-portion pack in the form of a container for ground roasted coffee, provided with filter paper in such a way that the beverage is easy to prepare and that the pack can be conveniently handled.

Another object is that the pack shall ensure prolonged storage of the ground roast coffee it contains without loss of aroma.

Yet another object of the invention is that it shall permit the coffee to be prepared as a drink simply by the immersion of the pack in hot water, and that the ground roasted coffee shall be extracted through the filter.

The principal feature of the invention resides in that the ground roast coffee in the container forming the pack is separated from the filter paper by a parting layer that is permeable to water. The invention is based on a recognition of the fact that the prepared coffee beverage will have a much better aroma if the packed portion of ground roasted coffee is prevented from coming into contact with the filter paper during storage. The parting layer according to the invention preferably consists of a perforated aluminium foil.

According to yet another feature of the invention the pack is provided with an external sheath of gastight material that can be removed prior to use and that will ensure the conservation of aroma during storage and transportation of the pack without further wrapping until it is used by the consumer.

The pack is used for the preparation of the coffee beverage by first tearing off at least part of the external sheath of the pack to permit water to enter the pack and to penetrate through the filter into the coffee.

BRIEF DESCRIPTION OF THE DRAWING

Some preferred embodiments of the invention will now be described by way of example and with reference to the accompanying drawings, in which:

FIG. 1 is a perspective view, partly in section, of a pack according to the invention;

FIG. 2 is a similar view of the upper part of a different form of construction of the proposed pack;

DESCRIPTION OF THE PREFERRED EMBODIMENT

Figure 3:
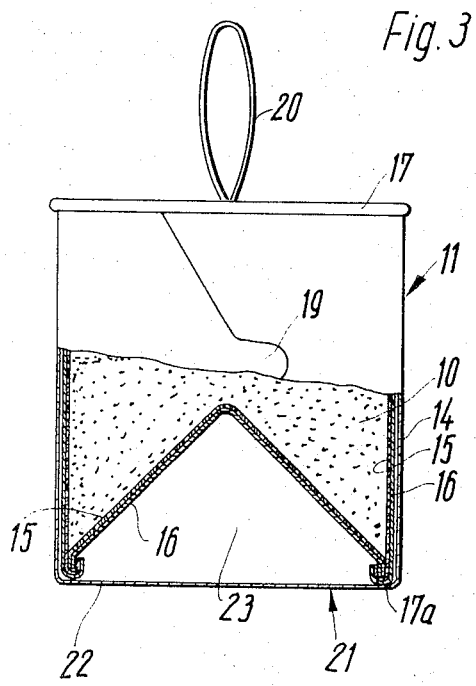
FIG. 3 is an elevational view, partly in section, of a pack according to the invention with a specially shaped bottom.

The idea which underlies the invention resides in filling a portion of ground roasted coffee 10 into a pack in the form of a container which firstly fulfils the functions of an aroma-conserving pack and secondly that of a filter for the preparation of a filtered coffee beverage. In the embodiment according to FIG. 1 the illustrated container comprises a cylindrical portion 11, a top 12 and a bottom 13. The cylindrical portion 11 has several walls. It is composed of a gastight outer sheath 14, preferably of aluminum foil, a parting layer that is pervious to water and liquids, particularly a perforated aluminum foil 15, and a layer of filter paper 16 between these two layers. One of the purposes of the perforated aluminum foil 15 is to keep the ground roasted coffee 10 away from the filter paper 16, preventing the coffee oil of the roasted coffee from penetrating the filter paper 16 during storage, i.e. prior to use. The outer sheath 14 of aluminum foil serves the purpose of protecting the filter paper externally from damage before it is used and principally of making the entire container aroma-tight. In the embodiments according to FIGS. 2 and 3 the top and the bottom are single-walled and preferably likewise consist of aluminum. The foil 15 has a mesh size or perforations of such dimensions that the ground coffee 10 cannot pass through the holes and contact the filter paper 16. This may be accomplished by using a finely perforated aluminum foil or film, or an equivalent material having a small mesh size, as disclosed in U.S. Pat. 3,511,666.

The three layers or walls 14, 15, 16 of the cylindrical portion are simultaneously connected to the bottom 13 and—after the roasted coffee has been filled into the same—with the top, preferably in one operation by forming a beaded seam. In the embodiment according to FIG. 1 an outwardly projecting bead 17 is formed at the edge of the top 12 and an outwardly projecting bead 18 is formed at the edge of the bottom 13.

In the embodiment according to FIG. 2 the top 12a and correspondingly the bottom (not shown) are preformed by deep drawing. This permits the beaded seam 17a at the top 12a and analogously that at the bottom to be formed on the inside, so that the external circumferential surface of the container remains smooth.

When the container is used, i.e. when the coffee is prepared for drinking, at least part of the gastight outer sheath 14 is removed. In the embodiments according to FIGS. 1 to 3 the major part of the external sheath 14 is therefore torn off, exposing the filter paper 16. To facilitate the tearing off of the external sheath 14 the latter may be formed with a tab 19 and possibly with tear-off marks and score lines (not shown).

After the removal of the outer sheath 14, the container can be put or hung into a cup, pot, or the like. The water can then penetrate into the interior of the container through the filter paper 16 and the perforated aluminum foil 15 and extract the ground roasted coffee 10. For conveniently hanging the container into a pot or the like it is provided with a suspension means which in the illustrated embodiment in FIGS. 1 to 3 has the form of a thread 20 forming a loop.

Instead of the cylindrical portion 11 or in addition thereto, other parts of the pack or container may also be of multi-layer construction, the aroma-tight outer sheath having at least partly to be removed when the pack is to be used.

FIG. 3 shows a form of construction which comprises a multi-layer bottom 21 of the same layered construction as the cylindrical portion 11, namely an aluminum foil 15 on the inside underlaid by a layer of filter paper 16 and an aroma-tight outer bottom 22. In the illustrated example, the latter is integral with the outer sheath 14 of the cylindrical portion 11. For use of this one-portion pack it is preferred to remove not only part of the outer sheath 14 from the cylindrical part but also the outer bottom 22.

A feature of this embodiment is that the bottom layers which remain when the outer bottom 22 has been removed, and which consist of the aluminum foil 15 and the filter paper 16, project into the interior of the container in the form for instance of a cone. A corresponding air pocket 23 is thus formed under the bottom of the container, and, when the container is suspended or placed in water, the air in this pocket 23 will seek to escape upwards. It then penetrates the foil 15 and the filter paper 16 as well as the roasted coffee 10 and thus causes the coffee to be agitated and turned over, permitting the water to pass through a major surface area of the bottom of the container and thereby more effectively penetrating the roasted coffee. The roasted coffee 10 is better wetted and more quickly extracted by the water than would otherwise be the case.

Figure 4:
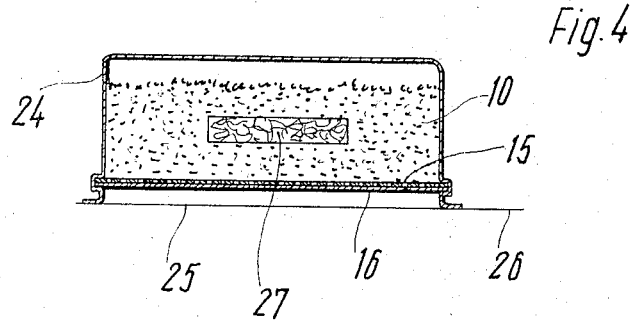
FIG. 4 is a similar view of a third embodiment of a pack according to the invention.

FIG. 4 illustrates a pack that differs from the previous embodiments in its exterior shape. A deep drawn cup-shaped container 24 of aroma-tight material, such as aluminum foil is covered at its open end with a foil 25 that can be pulled off with the aid of a tear-off lug 26. On the side facing the roasted coffee 10 of the foil 25 there is a perforated aluminum foil 15 and a layer of filter paper 16. The aluminum foil 15 and the filter paper 16 may, as illustrated, be anchored in the wall of the container at a level spaced inwardly away from the foil 25, or they may be secured to the bottom edge of the container 24 together with the outer foil 25. In the latter case the foil 25 can be peeled off the filter paper 16 so that the latter remains in the container 24 together with the aluminum foil 15.

Besides the roasted coffee 10 the container 24 may also contain a water-absorbing space formed by a suitable porous sponge-like body, 27. This sponge-like body which is made of a material that has no smell or taste, such as plastics material, absorbs water when after the removal of the sheath 25 water is poured over the container 24 or the container is suspended in water. The absorption of water causes the sponge body 27 to swell and to apply pressure to the roasted coffee 10 from the inside. This also facilitates thorough wetting and a more rapid and thorough extraction of the roasted coffee 10. The sponge body 27 may in its original state be pre-compressed, as in FIG. 4, so that the absorption of water brings about a considerable increase in volume of the sponge body 27.

The invention may be embodied in other specific forms without departing from the spirit or essential characteristics thereof. The embodiments are therefore to be considered in all respects as illustrative and not restricitve.

What is claimed is:

1. A one-portion pack for the preparation of a filtered coffee beverage, said pack comprising:

(1) a gastight, deep-drawn, open-faced container;

(2) a portion of roasted coffee contained in said deep-drawn, open-faced container;

(3) a parting layer covering and closing the open face of said deep-drawn, open-faced container, said parting layer being permeable to water but being capable of keeping said roasted coffee away from the filter paper recited in subparagraph (4) hereof and being nonabsorbent to coffee oils in the roasted coffee, thereby preventing coffee oil from said roasted coffee from penetrating the filter paper during storage;

(4) a layer of filter paper located adjacent to said parting layer on the side thereof opposite from said portion of roasted coffee, said layer of filter paper being of surface area equal to or less than said parting layer, whereby said layer of filter paper is prevented from coming into contact with said roasted coffee by said parting layer; and (5) a gastight outer sheath located adjacent to said layer of filter paper over at least a part of the inner surface of said gastight outer sheath, thereby protecting said layer of filter paper from damage before it is used, said gastight outer sheath being connected to said gastight, deep-drawn, open-faced container over the open face thereof so that said gastight outer sheath and said gastight, deep-drawn, open-faced container together completely surround said poration of roasted coffee, thereby making the entire pack aroma-tight, said gastight outer sheath having at least one portion located adjacent to said layer of filter paper which is removable prior to the preparation of a filter coffee beverage.

2. A one-portion pack as claimed in claim 1 wherein at least a portion of said gastight outer sheath located adjacent to said layer of filter paper is generally parallel to and spaced from said layer of filter paper and said parting layer.

3. A one-portion pack as claimed in claim 2 and further comprising a porous, water absorbing body, said porous, water absorbing body being disposed interiorly of said parting layer and being capable of swelling upon contact with and absorption of water.

References Cited
UNITED STATES PATENTS

| | | | |
|---|---|---|---|
| 2,330,884 | 10/1943 | Harriman | 99—77.1 |
| 2,157,656 | 5/1939 | Doble | 99—77.1 |
| 1,574,021 | 2/1926 | Bonnell | 99—77.1 UX |
| 1,576,735 | 3/1926 | Fessenden | 99—77.1 |
| 3,095,801 | 7/1963 | Fogg | 99—77.1 X |
| 3,083,101 | 3/1963 | Noury | 99—77.1 |
| 3,445,043 | 5/1969 | Bull | 222—386.5 |
| 2,659,935 | 11/1953 | Hammon | 206—46 UX |
| 2,123,054 | 7/1938 | Lamb et al. | 99—77.1 |
| 2,162,272 | 6/1939 | Patterson | 99—77.1 |
| 257,641 | 5/1882 | BeeBe | 99—323 |

FRANK W. LUTTTER, Primary Examiner

S. L. WEINSTEIN, Assistant Examiner

U.S. Cl. X.R.

99—295; 206—.5; 426—77, 115, 124